US005997426A

United States Patent [19]

Ito et al.

[11] Patent Number: 5,997,426
[45] Date of Patent: *Dec. 7, 1999

[54] VARIABLE SPEED POWER TRANSMISSION APPARATUS

[75] Inventors: Hideki Ito; Soichi Kawakami; Hiroshi Saito, all of Komaki, Japan

[73] Assignee: Mitsubishi Heavy Industries, Ltd., Tokyo, Japan

[ * ] Notice: This patent issued on a continued prosecution application filed under 37 CFR 1.53(d), and is subject to the twenty year patent term provisions of 35 U.S.C. 154(a)(2).

[21] Appl. No.: 08/810,288

[22] Filed: Mar. 3, 1997

[30] Foreign Application Priority Data

| | | | |
|---|---|---|---|
| Mar. 4, 1996 | [JP] | Japan | 8-045993 |
| Apr. 26, 1996 | [JP] | Japan | 8-107379 |

[51] Int. Cl.$^6$ .......... F16H 47/04
[52] U.S. Cl. .......... 475/80; 475/72; 475/82
[58] Field of Search .......... 475/7, 31, 72, 475/80, 81, 82, 218

[56] References Cited

U.S. PATENT DOCUMENTS

| | | | |
|---|---|---|---|
| Re. 27,307 | 3/1972 | DeLalio | 475/82 |
| 1,263,125 | 4/1918 | Sawyer | 475/7 |
| 3,411,381 | 11/1968 | Orshansky, Jr. | 475/80 |
| 3,597,998 | 8/1971 | Ebert . | |
| 3,748,924 | 7/1973 | Cross et al. | 475/82 |
| 4,313,351 | 2/1982 | Hagin | 475/80 |
| 4,471,668 | 9/1984 | Elsner | 475/72 |
| 5,584,772 | 12/1996 | Hayd | 475/72 |

FOREIGN PATENT DOCUMENTS

| | | |
|---|---|---|
| 0 137 406 | 4/1985 | European Pat. Off. . |
| 92 08 554 | 10/1993 | Germany . |
| 490 630 | 5/1970 | Switzerland . |

*Primary Examiner*—Sherry L. Estremsky
*Attorney, Agent, or Firm*—Wenderoth, Lind & Ponack, L.L.P.

[57] ABSTRACT

A variable speed power transmission apparatus having an epicycle reduction gear device that has planetary gears whose shafts are supported at equal intervals circumferentially thereof by carriers fixed to an output shaft thereof. The planetary gears are meshed between external teeth of a sun gear fixed to an input shaft connected to a drive source and internal teeth of a ring gear. The transmission apparatus also includes a variable speed hydraulic driver system that is driven by oil pressure generated by the drive source in such a way as to be variably and reversibly rotated by the oil pressure. An output shaft of the variable speed oil pressure driver system is connected to the ring gear in an interlocking relation to thereby cause forward rotation, reverse rotation or stoppage of the ring gear by the variable speed hydraulic driver system. Thus, the speed of the ring gear can be changed in a non-step manner. Since the invention has been constructed as mentioned above, the invention makes it possible to obtain a variable speed power transmission apparatus which enables highly efficient non-step change in the rotation speed thereof over a wide range without increased size and cost of the apparatus.

1 Claim, 8 Drawing Sheets

VARIABLE SPEED POWER TRANSMISSION APPARATUS

BACKGROUND OF THE INVENTION

1. Field of the Invention

The present invention relates to a variable speed power transmission apparatus which is applied to rotating machines such as drivers for driving a blower, pump, compressor, centrifugal separator, stirrer, mill, excavator, cutter machine, polishing machine, winch, crane hoister and automobile collision tester and which is intended to be used for making variable the output rotations number of the rotating machine.

2. Description of the Related Art

While almost all rotating machines such as drivers for driving a blower, pump, compressor, centrifugal separator, stirrer, mill, excavator, polishing machine, winch, crane hoister and automobile collision tester have each been used with their fixed rotations number, when using each of these rotating machines with the output rotations number thereof being kept variable, the following means have hitherto been adopted.

(1) Use is made of a rotating machine that has been prepared by using an AC (Alternating Current) motor and an inverter in combination, or by using a DC (Direct Current) motor and a thyristor in combination. In this case, it becomes necessary to use an installation space for installing a controller device for controlling the inverter or thyristor, with the result that the size of the rotating machine is increased. In addition, since it is needed to maintain the temperature of the installation space (control chamber or the like) at a fixed value, it is necessary to use an air conditioner, with the result that the size of the rotating machine is further increased and in addition the facilities involved therein become high in cost.

(2) Use is made of a rotating machine that has been prepared by using concurrently used AC/DC motors, hydraulic pump and hydraulic motor in combination, or by using an engine, hydraulic pump and hydraulic motor in combination. In this case, although a wide range of variable speeds is obtained, the efficiency becomes low and the power consumption increases.

SUMMARY OF THE INVENTION

The present invention has been made in order to solve the above-mentioned problems and has a first object to provide a variable speed power transmission apparatus whose speed can be varied in non-step manner over a wide range of rotations numbers while making unnecessary the use of an inverter or thyristor used in the prior art and thereby preventing the increase in size of the apparatus as well as making the cost thereof low.

Also, a second object of the present invention is to provide a variable speed power transmission apparatus which enables the decrease in the power that is to be consumed for driving the apparatus and has a higher efficiency than in the prior art, such as a power transmission device that uses a hydraulic pump driven by an engine or power driven motor and a hydraulic motor.

In order to attain the above objects, the present invention provides the following means.

(1) First means is a variable speed power transmission apparatus comprising an epicycle reduction gear device that has planetary gears whose shafts are supported at equal intervals taken circumferentially thereof by carriers fixed to an output shaft thereof, the planetary gears being meshed between external teeth of a sun gear fixed to an input shaft connected to a drive source and internal teeth of a ring gear, and a variable speed hydraulic driver system that is driven by an oil pressure generated by a power of the drive source in such a way as to be variably and reversibly rotated by the oil pressure, an output shaft of the variable speed oil pressure driver system being connected to the ring gear in interlocking relation therewith to thereby cause forward rotation, reverse rotation or stoppage of the ring gear by the variable speed hydraulic driver system.

Accordingly, according to the first means, by causing a change in the rotations number of the output shaft of the variable speed hydraulic drive system while causing forward rotation or reverse rotation thereof, or by causing a stoppage of this output shaft, the ring gear is forward rotated, reverse rotated or stopped. By this driving of the ring gear, the speed of the epicycle reduction gear device can be changed freely over a wide range.

(2) Second means comprises a hydraulic pump and a hydraulic motor that are used as the variable speed hydraulic driver system in the first means. The second means is a variable speed power transmission apparatus comprising an epicycle reduction gear device that has planetary gears whose shafts are supported at equal intervals taken circumferentially thereof by carriers fixed to an output shaft thereof, the planetary gears being meshed between external teeth of a sun gear fixed to an input shaft connected to a drive source and internal teeth of a ring gear, and a hydraulic driver system that includes a variable amount of discharge type hydraulic pump and a variable speed and reversible rotation type hydraulic motor that is driven by a pressure oil supplied from the hydraulic pump, an output shaft of the hydraulic motor being interlockingly connected to the ring gear by means of transmission means such as a gear to thereby cause forward rotation, reverse rotation or stoppage of the ring gear by the hydraulic motor.

Accordingly, according to the second means, by adjusting the state of discharge of the hydraulic pump, the rotation of the hydraulic motor is changed, namely the hydraulic motor is forward rotated, reverse rotated or stopped. When the hydraulic motor has been stopped, the ring gear that has been directly connected thereto is brought to a state of its being made stationary, with the result that the rotation of the input shaft of the epicycle reduction gear device is transmitted to the output shaft by having its speed reduced in a prescribed speed ratio. When the hydraulic motor has been forward rotated (rotated in the same direction as that of the output shaft), the ring gear also is forward rotated, with the result that the rotation of the input shaft of the epicycle reduction gear device is transmitted to the output shaft by having its speed more increased than when the ring gear is stopped. Also, when the hydraulic motor has been reverse rotated, the ring gear also is reverse rotated, with the result that the rotation of the input shaft is transmitted to the output shaft by having its speed more reduced than when the ring gear is stopped.

As mentioned above, by rotating the ring gear by means of the hydraulic motor, the rotation of the output shaft can be changed in non-step manner through the epicycle reduction gear device.

(3) Also, in the second means, it may be arranged to drive a rotating shaft of the hydraulic pump by a drive force that is transmitted thereto from the input shaft of the sun gear through power transmission means such as a power transmission gear.

By this arrangement, the rotations number of the hydraulic pump can be controlled in interlocking relation with the rotations number of the input shaft of the epicycle reduction gear device to thereby enable simple control of the rotations number of the output shaft.

(4) Further, in the second means, it can be also arranged to connect the rotating shaft of the hydraulic pump to a second input shaft that has been provided separately from the input shaft of the epicycle reduction gear device.

By this arrangement, since the rotations number of the hydraulic pump can be arbitrarily controlled irrelevantly to the rotations number of the input shaft of the epicycle reduction gear device, the output rotations number that results from the hydraulic pump and hydraulic motor and the ring gear can be controlled over a wider range of controls and also the output rotations number can easily be set to a target rotations number.

(5) Third means is a variable speed power transmission apparatus wherein, in the first and second means, a clutch is interposed between the input shaft of the epicycle reduction gear device and the rotating shaft of the hydraulic pump.

Accordingly, according to the third means, when any inconvenience has occurred in the hydraulic system, the clutch is made "off", whereby it is possible to prevent the occurrence of secondary inconveniences in the hydraulic system as well as the production of a resistance loss that is applied from the hydraulic pump to the input shaft side.

(6) Fourth means is one of arrangements obtained by embodying the variable speed hydraulic driver system that is used in the first means and this fourth means is a variable speed power transmission apparatus comprising the epicycle reduction gear device that has planetary gears whose shafts are supported at equal intervals taken circumferentially thereof by the carriers fixed to the output shaft thereof, the planetary gears being meshed between the external teeth of the sun gear fixed to the input shaft and the internal teeth of the ring gear, and a hydraulic driver system that includes a variable amount of discharge type hydraulic pump and a variable speed and reversible rotation type hydraulic motor that is driven by a pressure oil supplied from the hydraulic pump, an output shaft of the hydraulic motor having a worm fixed thereto, the worm being meshed with a worm wheel that is connected to the ring gear, whereby the ring gear is forward rotated, reverse rotated or stopped by the hydraulic motor.

Accordingly, according to the fourth means, when an overload has acted on the output shaft side, this overload is supported by the worm mechanism composed of the worm and the worm wheel. By the reverse rotation prevention action of this worm mechanism, it is possible to prevent the overload from acting on the hydraulic motor.

(7) Fifth means is an arrangement comprising an epicycle reduction gear device that has planetary gears whose shafts are supported at equal intervals taken circumferentially thereof by carriers fixed to an output shaft thereof, the planetary gears being meshed between external teeth of a sun gear fixed to an input shaft to which a torque is input from a drive source through a transmission and internal teeth of a ring gear, and a hydraulic transmission to which the torque is input from an output end of the drive source through a transmission path that branches off from a transmission path that leads to the transmission, an output shaft of the hydraulic transmission being interlockingly connected to the ring gear by means of transmission means such as a gear to thereby cause forward rotation, reverse rotation or stoppage of the ring gear by the hydraulic transmission.

Accordingly, according to the fifth means, when changing the output rotations number of the hydraulic transmission while causing forward rotation or reverse rotation thereof, the rotation of the ring gear is changed while this ring gear is kept in a state of its being forward rotated or reverse rotated. Also, when the output of the hydraulic transmission is switched to a state of its being made "off", the ring gear is made stationary. On the other hand, the rotation of the input shaft is changed by the one side transmission that is directly connected to the drive source. Accordingly, by simultaneously controlling the rotation of the input shaft and the rotation of the ring gear, in both the forward rotation and the reverse rotation of the ring gear non-step control thereof can be made over a wider range of rotations numbers.

(8) Sixth means is an arrangement comprising the hydraulic transmission and epicycle reduction gear device that are the same as in the fifth means and in addition thereto a worm mechanism that is composed of a worm that is connected to the output shaft of the hydraulic transmission and a worm wheel that is meshed with the worm, the worm wheel of the worm mechanism being interlockingly connected to the ring gear, whereby the ring gear is forward rotated, reverse rotated or stopped from the hydraulic transmission through the worm mechanism.

Accordingly, according to the sixth means, the torque from the drive source that operates with a fixed number of rotations is on one hand transmitted to the input shaft of the epicycle reduction gear device through the transmission of mechanical or the like's type and is on the other hand transmitted to the ring gear of the epicycle reduction gear device through the hydraulic transmission and worm mechanism to thereby cause a change in the output rotations number of the hydraulic transmission while causing forward rotation or reverse rotation of it. Also, by making "off" the output of the hydraulic transmission, the rotation of the ring gear is changed while keeping this ring gear in a state of its being forward rotated or reverse rotated, or is stopped. Accordingly, by simultaneously controlling the rotations number of the input shaft and the rotations number of the ring gear as in the fifth means, in both the forward rotation and the reverse rotation of the ring gear non-step control thereof can be made over a wider range of rotations numbers.

Further, since the worm mechanism has been interposed between the output end of the hydraulic transmission and the ring gear, when an overload has acted on the output shaft side, this overload is undertaken by this worm mechanism through the reverse rotation prevention action based on the combination of the worm and the worm wheel. Whereby, it is possible to prevent the overload from being transmitted to the hydraulic transmission.

(9) Seventh means is an arrangement wherein, in each of the first to sixth means, the ring gear has additionally provided thereon a brake for stopping the rotation of this ring gear.

Accordingly, according to the seventh means, when inconveniences such as malfunction of the hydraulic pump, hydraulic motor, hydraulic transmission or the like, oil leakage from the oil piping, etc. have occurred in the hydraulic system, the brake is operated to thereby stop the rotation of the ring gear. As a result, there is formed a speed reduction system of a fixed speed reduction ratio wherein the ring gear of the epicycle reduction gear device has been fixed, with the result that the output shaft is rotated with a prescribed fixed number of rotations. Also, if the brake is released, non-step speed change operation that is similar to that which is performed in the first to sixth means can be realized.

(10) As mentioned above, according to the present invention, the following effects can be procured.

By causing forward rotation, reverse rotation or stoppage of the ring gear of the epicycle reduction gear device by a variable speed hydraulic driver system such as a hydraulic pump and hydraulic motor, hydraulic transmission, etc., the rotation of the output shaft can be changed in non-step manner over a wide range of rotations numbers.

Accordingly, it becomes unnecessary to use an inverter or thyristor that is used in the conventional means which uses an AC motor or DC motor. In addition, it becomes also unnecessary to use an air conditioner equipment for a space that is used to install therewithin a controller device for controlling each of these parts. As a result, it is possible to realize reduction in size and cost of the apparatus.

Also, since the ring gear of the epicycle reduction gear device is only rotated by the combined system of the hydraulic pump and hydraulic motor or by the hydraulic transmission, the power consumption is small, with the result that remarkable rise in the efficiency can be achieved compared to the conventional power transmission apparatus that uses the hydraulic pump that is driven by an engine or power driven motor and the hydraulic motor.

DETAILED DESCRIPTION OF THE PREFERRED EMBODIMENTS

Figure 1:
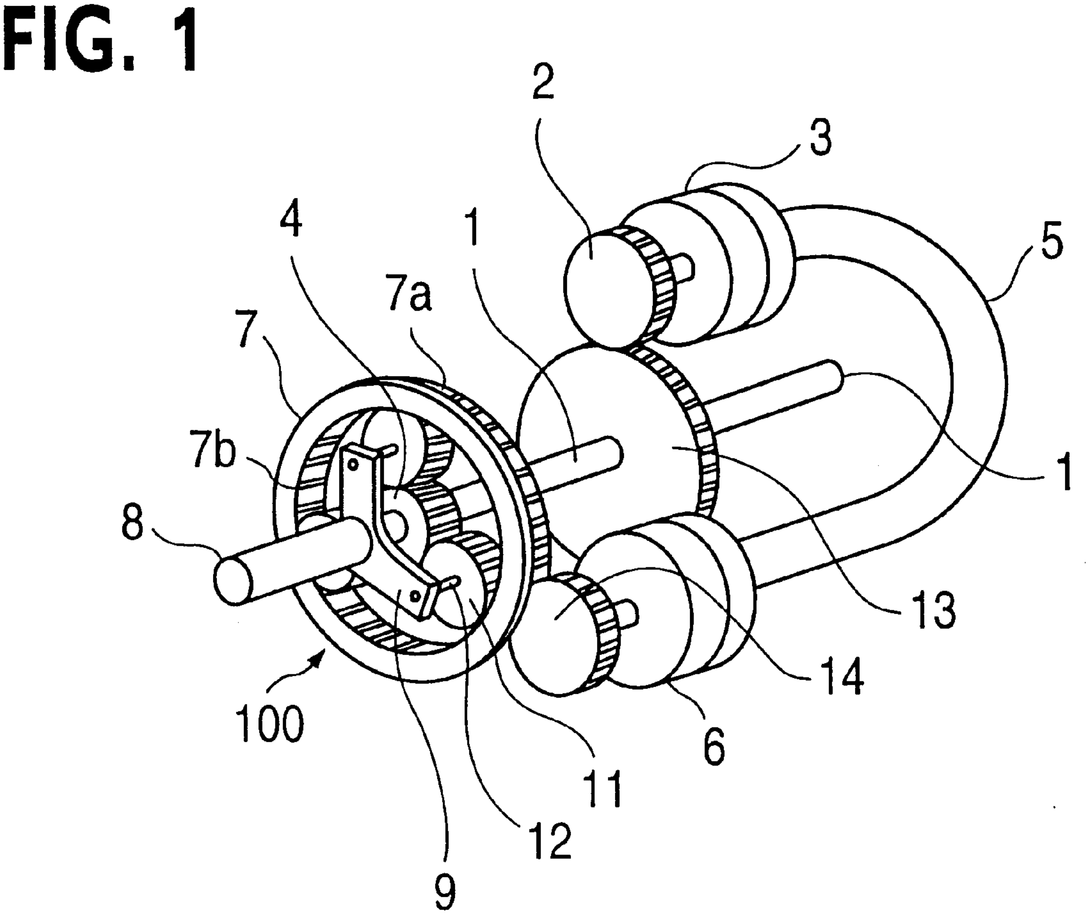
FIG. 1 is a perspective view illustrating the outer appearance of a variable speed power transmission apparatus according to a first embodiment (specific example) of the present invention.

In FIG. 1 which illustrates a first embodiment of the present invention, a reference numeral 1 denotes an input shaft, a reference numeral 100 denotes a differential epicycle reduction gear device, and a reference numeral 8 denotes an output shaft. A reference numeral 4 denotes a sun gear of the epicycle reduction gear device that has been secured to an end portion of the input shaft 1, a reference numeral 7 denotes a ring gear of the epicycle reduction gear device 100, a reference numeral 9 denotes carriers of the epicycle reduction gear device 100 that have been fixed to the output shaft 8, a reference numeral 12 denotes a plurality (three in this embodiment) of planet shafts that are fixed to the carriers 9 at equal intervals taken in the circumferential direction of the epicycle reduction gear device 100, and a reference numeral 11 denotes planetary gears whose shafts are supported by the planet shafts 12 respectively and which are meshed with external teeth of the sun gear 4 and internal teeth 7*b* of the ring gear 7.

A reference numeral 3 denotes a variable discharge type hydraulic pump and a reference numeral 6 denotes a variable speed and reversible rotation type hydraulic motor that is driven by pressure oil that is forcedly supplied from the hydraulic pump 3 through an oil pipe 5. To the input shaft 1 there is secured an input shaft gear 13 which is meshed with a pump driving gear 2 that is fixed to an input shaft of the hydraulic pump 3, whereby the hydraulic pump is driven by the torque of the input shaft 1.

A reference numeral 14 denotes an input gear that has been fixed to the output shaft of the hydraulic motor 6. The input gear 14 is meshed with external teeth 7*a* of the ring gear 7 of the epicycle reduction gear device 100. As a result, the epicycle reduction gear device 100 is equipped with two input systems, one of which is a first input system having its torque input from the input shaft 1 to the sun gear 4 and the other of which is a second input system having its torque input from the input gear 14 of the hydraulic motor 6 to the ring gear 7.

The operation of the variable speed power transmission apparatus that has been constructed as mentioned above will now be explained.

The torque of the input shaft is transmitted to the variable discharge type hydraulic pump 3 through the input shaft gear 13 and pump driving gear 2 to thereby drive the hydraulic pump 3. The pressure oil that has been discharged from the hydraulic pump 3 is supplied to the hydraulic motor 6 by way of the oil pipe 5, whereby the hydraulic motor 6 is driven for rotation. In the driving system having the hydraulic pump 3 and hydraulic motor 6 used in combination, when the amount of discharge of the hydraulic pump 3 is varied through electric control or manually, the number of rotations of the hydraulic motor 6 is varied and, since this hydraulic motor 6 is reversible, the rotation direction thereof also is varied. Accordingly, it results that the rotational force or torque of this hydraulic motor 6 is input to the ring gear 7 through the input gear 14. Whereby, the ring gear 7 is rotated forwardly, rotated in a reverse direction or stopped (made stationary).

On the other hand, the torque of the input shaft 1 is input to the sun gear 4 of the epicycle reduction gear device 100 and is transmitted from this sun gear 4 to the output shaft 8 through the planetary gears 11 each making its rotation around the sun gear 4 while making its rotation about its own axis between the sun gear 4 and internal teeth 7*b* of the ring gear 7 and then through the carriers 9.

In the power transmission system illustrated in FIG. 1, when the hydraulic pump 3 is stopped, the hydraulic motor also is stopped, and thus the rotation of the ring gear 7 is stopped through the input gear 14 and as a result the ring gear 7 is brought to a state of its being made stationary. In this case, the rotation of the input shaft 1 is transmitted to the output shaft 8 through the sun gear 4, planet gears 11 and carriers 9 that are combined with each other into an ordinary epicycle reduction gear device form by having its speed reduced to a number of rotations that is determined according to the teeth numbers of the respective gears.

Also, when the ring gear 7 is caused to rotate in a reverse direction from that of the output shaft 8 by the hydraulic motor 6, the number of rotations that are transmitted from the carriers 9 to the output shaft 8 is more decreased than the number of rotations which when the ring gear 7 is in a state of its being stopped (made stationary) is transmitted thereto. Further, when the ring gear 7 is rotated in the same direction as that of the output shaft 8 by the hydraulic motor 6, conversely to the above, the number of rotations of the output shaft 8 is increased and hence the speed thereof is more increased than when the ring gear is kept stationary.

In the first embodiment illustrated in FIG. 1, when the rotations number of the input shaft 1 is changed and it is desired to restore the rotations number of the output shaft 8 to a target rotations number, it is arranged to change the amount of discharge of the hydraulic pump 3, to thereby cause the forward rotation, stoppage or reverse rotation of the hydraulic motor 6, to thereby cause the forward rotation, stoppage or reverse rotation of the ring gear 7, and to thereby cause the restoration and maintenance of the rotation of each of the carriers 9 and output shaft 8 to and at the target rotations number.

In this first embodiment, as mentioned above, by controlling the state of discharge of the hydraulic pump 3 and thereby causing the forward rotation, stoppage or reverse rotation of the hydraulic pump 6 and thereby causing a change in the forward or reverse rotations number, or stoppage, of the ring gear 7 of the differential epicycle reduction gear device 100, it is possible to cause non-step change in the rotations number of the output shaft 8.

Figure 2:
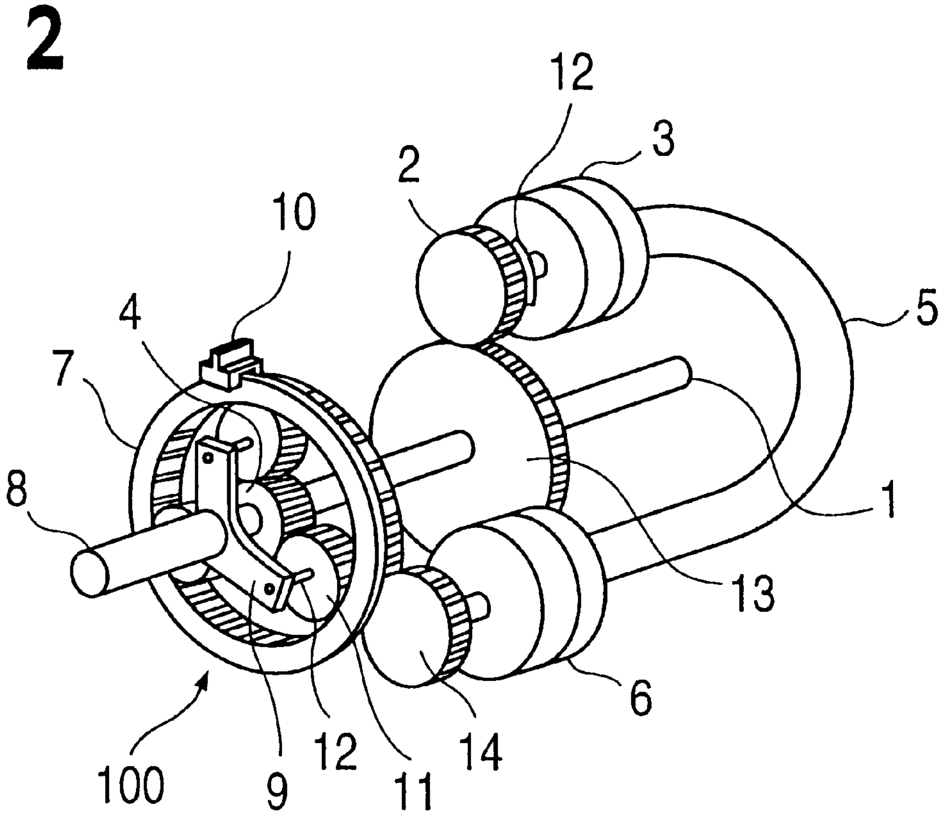
FIG. 2 is a perspective view illustrating the outer appearance of the structure of a variable speed power transmission apparatus according to a second embodiment of the present invention.
Figure 3A:
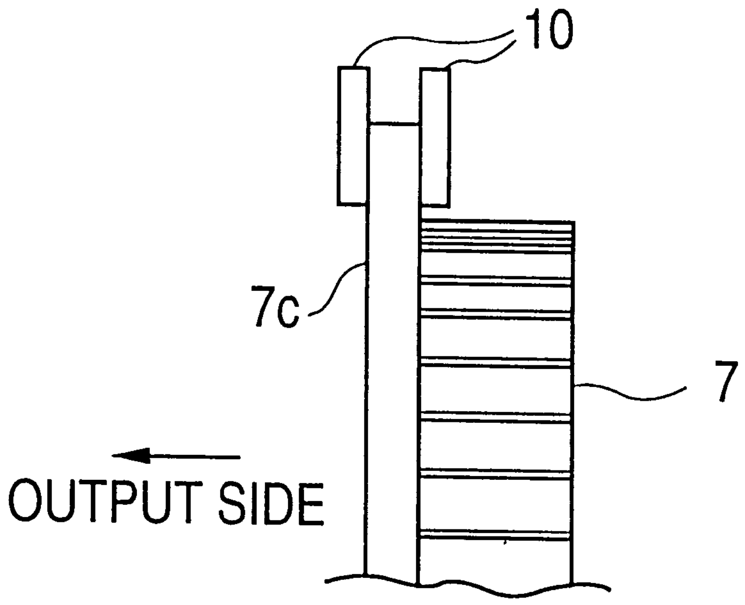
FIGS. 3(A) and 3(B) are both enlarged perspective views illustrating a brake mount portion of a ring gear according to the second embodiment of the present invention.
Figure 3B:
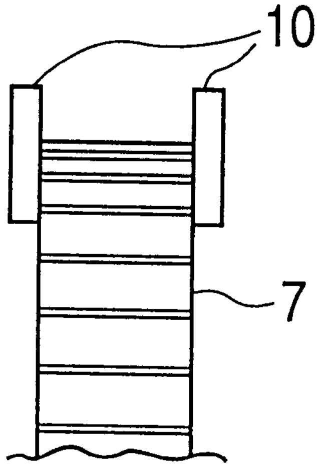
Figure 4:
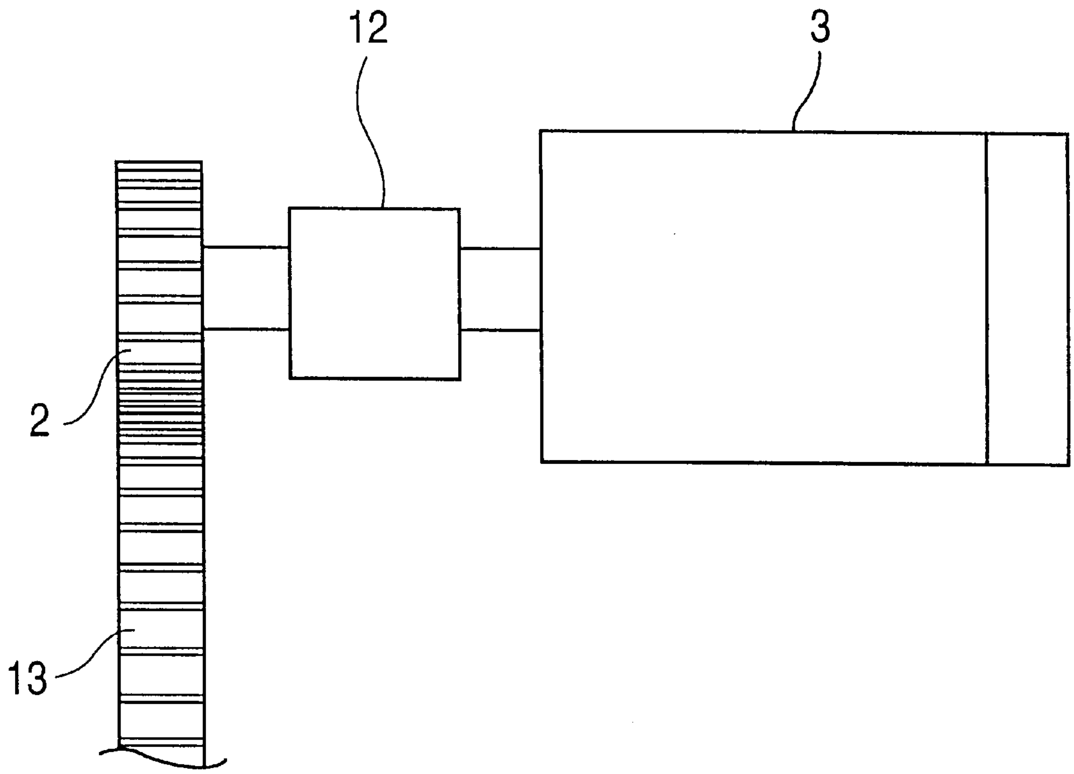
FIG. 4 is an enlarged side elevation view illustrating the structure of the clutch mount portion according to the second embodiment illustrated in FIG. 2.

In a second embodiment of the present invention that is illustrated in FIGS. 2 to 4, on an outer periphery of the ring gear 7 there is mounted a brake 10 for braking this ring gear 7 and, on the other hand, as illustrated in FIG. 4, a clutch 12 is interposed between the pump driving gear 2 and the hydraulic pump 3. This type of brake 10 includes a disk brake system wherein, as illustrated in FIG. 3(A), a disk 7*c*, whose diameter has been increased by the amount necessary to brake the rotation of the ring gear 7, is provided on one side (e.g., output shaft side) of the ring gear 7. The disk 7*c* is clamped for braking. In a disk brake system, as illustrated in FIG. 3(B), the ring gear 7 is clamped from both sides thereof by means of pads, etc. The remaining construction of this second embodiment is the same as that of the first embodiment and therefore the same members or components are denoted by the same reference symbols.

In FIGS. 2 to 4, during an ordinary operation in which the output rotations number is made variable, the brake 10 is released to thereby perform the same operation as in the case of the first embodiment. In this case, the clutch 12 is made "on". When the hydraulic pump 3 or hydraulic motor 6 has malfunctioned, or leakage of the pressure oil has occurred in the oil pipe 5 system, with the result that the adjustment of the rotations number of the ring gear 7 by the hydraulic motor 6 has become disabled, the brake 10 is activated to thereby make the ring gear 7 stationary. As a result, the ring gear 7 is made stationary, thus the rotation of the input shaft 1 is made to have its rotations number decreased down to a fixed rotations number by the planetary gear 11 and carriers 9 and this reduced rotational speed is transmitted to the output shaft 8.

It is to be noted that during an operation in which the ring gear 7 has been made stationary due to the malfunction or the like of the hydraulic system, the clutch 12 is deactivated or "turned off" to thereby interrupt the transmission of the torque from the pump driving gear 2 to the hydraulic pump 3 and thereby stop the operation of the hydraulic system.

Also, during a normal operation of the hydraulic system, when the rotations number of the input shaft 1 has changed and it is desired to maintain the rate of rotation of the output shaft 8 to be at a fixed value, it is arranged to release the brake 10 and activate or "turn on" the clutch 12 to thereby adjust the rotation of the ring gear 7 and thereby rotate the output shaft 8 with a fixed rate of rotation.

Figure 5:
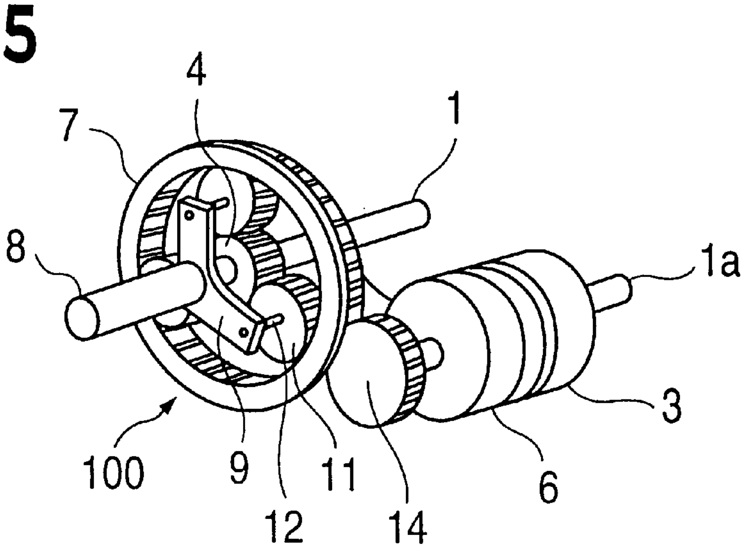
FIG. 5 is a perspective view illustrating the outer appearance of a variable speed power transmission apparatus according to a third embodiment of the present invention.

In a third embodiment of the present invention that is illustrated in FIG. 5, the variable amount of discharge type hydraulic pump and the variable/reversible rotation type hydraulic motor 6 are provided close to each other, or are provided with their housings being coupled to each other and integrated. Further, an oil passage that replaces the oil pipe 5 (see FIG. 1) is provided within the pump 3 and motor 6. Further, it is arranged to input the torque to the hydraulic pump 3 from an input shaft la that is separate from the sun gear 4.

In this embodiment, the operation thereof is the same as that in the first embodiment except that the torque to be input to the hydraulic pump 3 is input thereto from the independent input shaft 1*a*. Also the amount of discharge of the hydraulic pump 3 is electrically or manually controlled.

According to this embodiment, since the hydraulic pump 3 and hydraulic motor 6 are structurally integrated with each other, the use of the hydraulic piping that is exposed to the outside becomes unnecessary. Further, the use of the hydraulic-pump driving gear system becomes also unnecessary. As a result, the entire structure of the apparatus becomes simplified and miniaturized.

Also, since the input shaft 1*a* has been provided independently from the input shaft 1 of the epicycle reduction gear device 100, the rotation rate of the hydraulic pump 3 becomes controllable irrelevantly to and independently of the epicycle reduction gear device 100. Therefore, when the rotation rate of the input shaft 1 has changed and it is desired to maintain the rotation rate of the output shaft 8 to be at a fixed target rotation rate, it is possible by adjusting the rotation rate of the input shaft 1*a* of the hydraulic pump 3 to easily set the rotation rate of the output shaft 8 to be at the target rotation rate.

Figure 6:
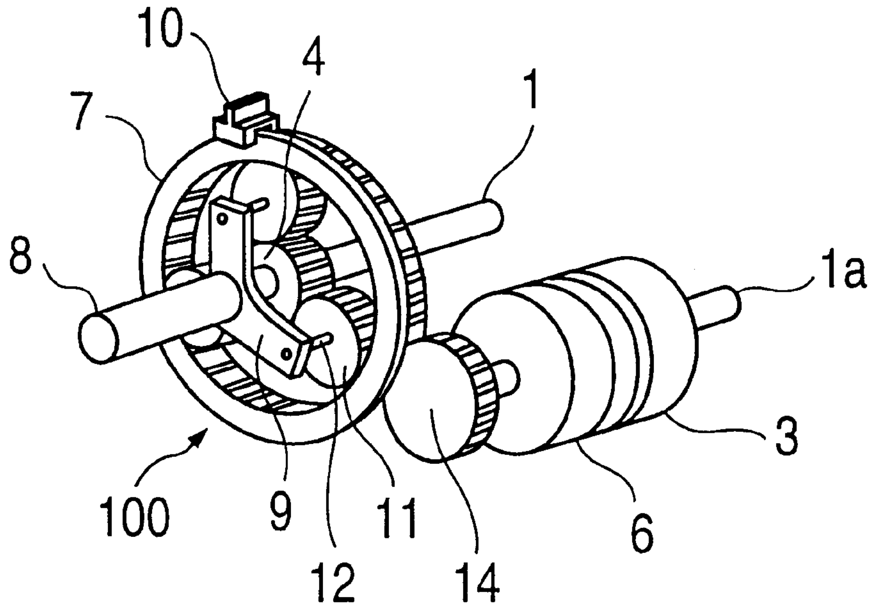
FIG. 6 is a perspective view illustrating the outer appearance of a variable speed power transmission apparatus according to a fourth embodiment of the present invention.

In a fourth embodiment that is illustrated in FIG. 6, a brake 10 that can brake the rotation of the ring gear 7 and that is similar to that which is illustrated in FIG. 3(A) or 3(B) is additionally provided on the variable speed power transmission apparatus according to the third embodiment illustrated in FIG. 5.

In the fourth embodiment, during an ordinary variable speed operation, the brake 10 is released (turned "off") and the rotation rate of the input shaft 1*a* of the hydraulic pump 3 is changed to thereby perform the same operation as in the case of the third embodiment illustrated in FIG. 5.

When an inconvenience such as a malfunction has occurred in the hydraulic system, the brake 10 is turned "on" to thereby make the ring gear 7 stationary and thereby operate the output shaft 8 with a rate of rotation that has been decreased in a prescribed speed ratio from the rate of rotation of the input shaft 1.

Also, even when no such inconvenience has occurred in the hydraulic system, in a case where the output shaft 8 is operated with a fixed rotation rate, the brake 10 is turned "on" to thereby make the ring gear 7 stationary and thereby operate the output shaft 8 with a rate of rotation that has been decreased in a prescribed speed ratio from the rotation rate of the input shaft 1.

Further, when the rotation rate of the input shaft 1 has changed and it is necessary to maintain the rotation rate of the output shaft 8 at a fixed value, the brake 10 is turned "off" and the rotation rate of the hydraulic-pump 3 side input shaft 1*a* is adjusted to thereby adjust the rotation rate and rotation direction of the ring gear 7 and thereby maintain the rotation rate of the output shaft 8 at a fixed value.

Figure 7:
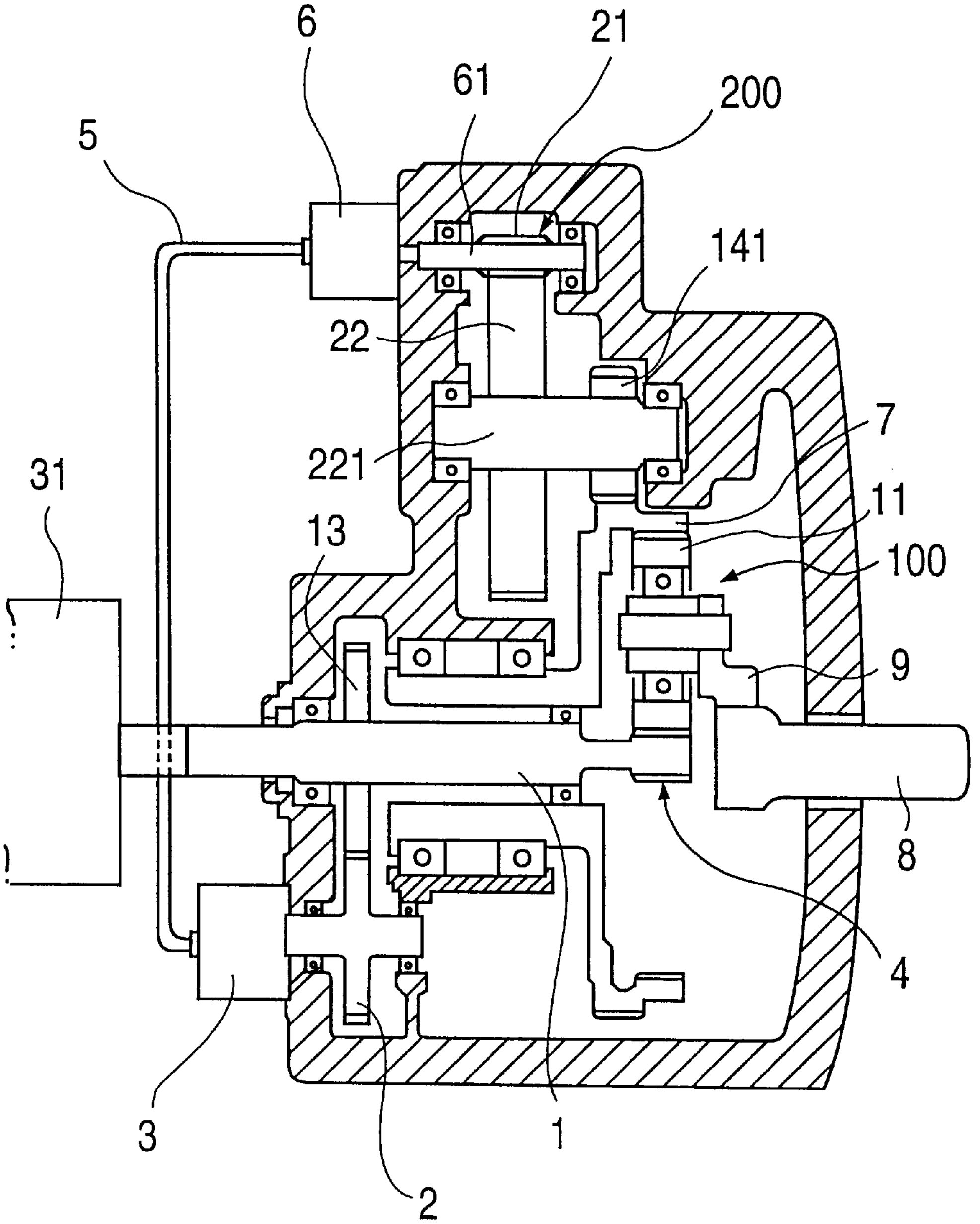
FIG. 7 is a sectional view illustrating a variable speed power transmission apparatus according to a fifth embodiment of the present invention.

In a fifth embodiment of the present invention that is illustrated in FIG. 7, a worm mechanism 200 composed of a worm 21 and a worm wheel 22 is interposed between the hydraulic motor 6 and the ring gear 7 of the epicycle reduction gear device 100 which are used in the first embodiment illustrated in FIG. 1.

That is, in FIG. 7, a reference numeral 21 denotes the worm that has been fixed to a worm shaft 61 that is connected directly to an output end of the hydraulic motor 6, a reference numeral 22 denotes a worm wheel that is meshed with the worm 21, a reference numeral 221 denotes a wheel shaft that has the worm wheel 22 fixed thereto, a reference numeral 141 denotes an input gear that is fixed to the wheel shaft and meshed with the ring gear, and a reference numeral 31 denotes a power source. The remaining construction is the same as in the case of the first embodiment illustrated in FIG. 1 and therefore the illustration thereof is made with the same members or components being denoted by the same reference symbols.

In the fifth embodiment that is illustrated in FIG. 7, the torque that is transmitted from the power source 31 is transmitted from the input shaft 1 to the epicycle reduction gear device 100 while, on the other hand, the hydraulic pump 3 is driven through the input shaft gear 13 and then through the pump driving gear 2.

The pressure oil that is supplied from the hydraulic pump 3 is supplied to the hydraulic motor 6 through the oil pipe 5, whereby the hydraulic motor 6 is driven by this pressure oil. The rotation of the hydraulic motor 6 has its speed reduced by the worm 21 and the worm wheel 22 and this reduced speed of rotation is transmitted to the ring gear 7 through the input gear 141. The operation in which the ring gear 7 is forward rotated, reverse rotated or stopped by the control that is made of the rotations number of the hydraulic motor 6 is the same as in the case of the first embodiment illustrated in FIG. 1.

Also, when an overload has acted on the output shaft 8 side, this overload acts, through the epicycle reduction gear device 100, on the worm mechanism 200 composed of the worm 22 and the worm wheel 21. In consequence, the overload is undertaken by the worm mechanism 200 as a result of the reverse rotation prevention action that results from the mesh between the worm 22 and the worm wheel 21. As a result, it is impossible that an excessive torque that results from this overload acts on the hydraulic motor 6 and its driving system.

Figure 8:
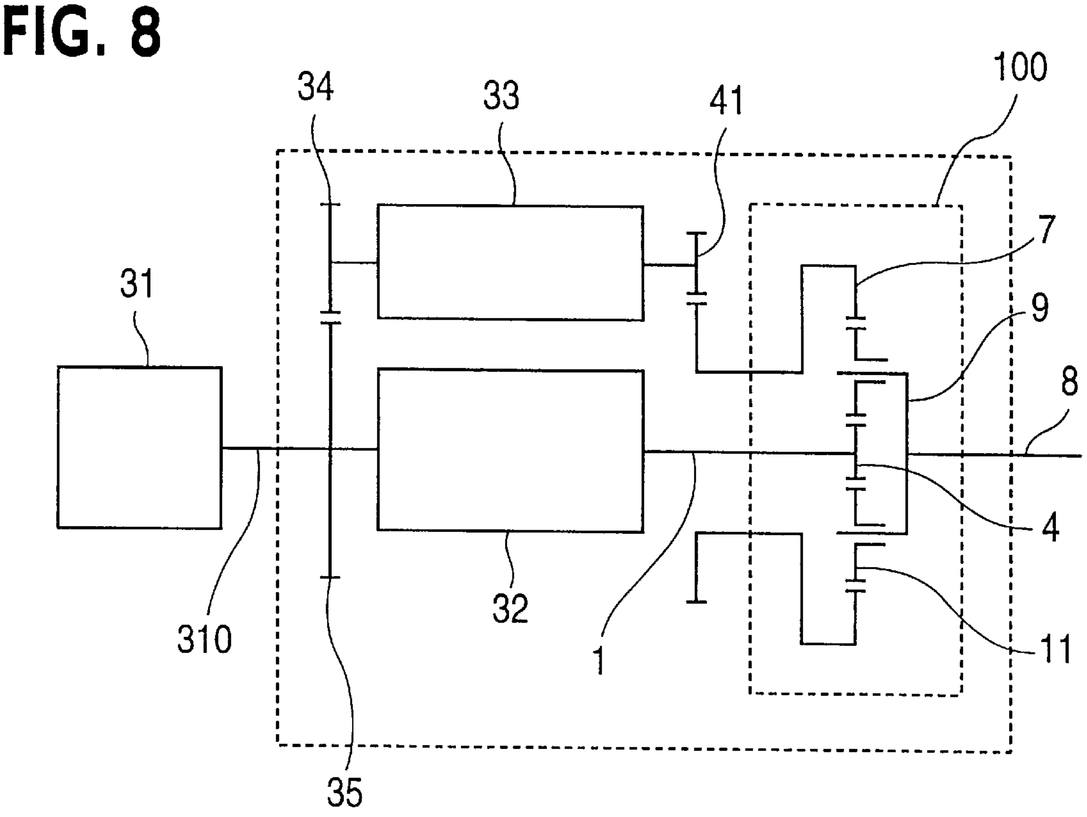
FIG. 8 is a diagrammatic view illustrating a variable speed power transmission apparatus according to a sixth embodiment of the present invention.

In a sixth embodiment that is illustrated in FIG. 8, the ring gear 7 of the epicycle reduction gear device 100 is connected to a hydraulic transmission that is driven by a power source.

That is, in FIG. 8, reference numeral 32 denotes a mechanical transmission, reference numeral 31 denotes the power source and reference numeral 33 denotes the hydraulic transmission. Thus, the drive force of one driving system for driving the output shaft 310 of the power source 31 is transmitted to the input shaft 1 of the epicycle reduction gear device 100 through the mechanical transmission 32 while, on the other hand, the drive force of the other driving system that branches off from the output shaft 310 is transmitted to the hydraulic transmission 33 through gears 35 and 34.

Also, the output end of the hydraulic transmission 33 is connected to the ring gear 7 through a gear 41.

In the sixth embodiment, the rotation direction, rotations number, transmission torque, etc. of the hydraulic transmission 33 are controlled by a controller device (not illustrated) and, by the output torque that results from this control, the ring gear 7 is forward rotated, reverse rotated or stopped.

On the other hand, because of the torque of the input shaft 1 being varible by the mechanical transmission 32, it results that the input shaft 1 and the ring gear 7 can be controlled respectively by the mechanical transmission 32 and the hydraulic transmission 33. This enables the operation of the variable speed power transmission apparatus over a wide range of rotation control.

Figure 9:
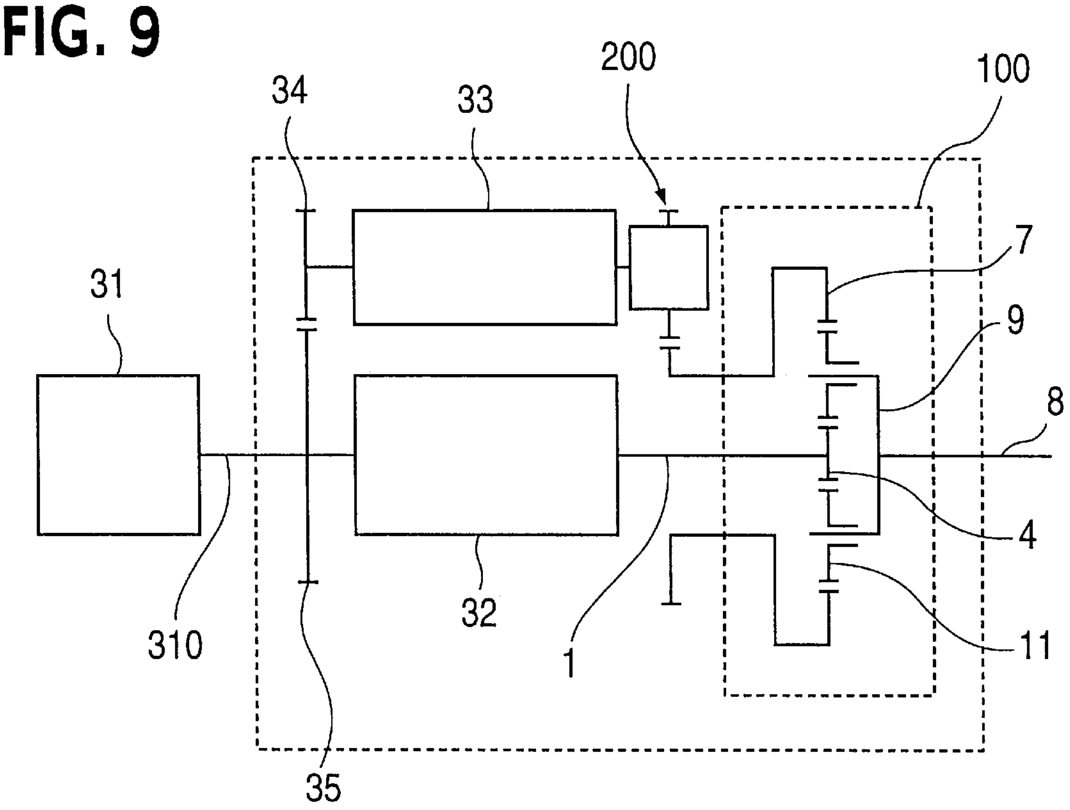
FIG. 9 is a diagrammatic view illustrating a variable speed power transmission apparatus according to a seventh embodiment of the present invention.

In a seventh embodiment of the present invention that is illustrated in FIG. 9, the worm mechanism 200 composed of the worm 21 and the worm wheel 23 that is the same as in the case of the fifth embodiment illustrated in FIG. 7 is interposed between the output end of the hydraulic transmission 33 and the ring gear 7.

That is, in FIG. 9, the reference numeral 31 denotes the power source, the reference numeral 32 denotes the mechanical transmission, and the reference numeral 33 denotes the hydraulic transmission. Whereby, the hydraulic transmission 33 is driven by the drive force that has been made to branch off from the output shaft 310 through gears 35 and 34.

Also, the worm 21 of the worm mechanism 200 is connected to the output end of the hydraulic transmission 33 (FIG. 7) in an interlocking relation. With this worm 21 there is meshed the worm wheel 22. Further, to this worm wheel 22 there is connected the ring gear 7 of the epicycle reduction gear device 100.

By this construction, when the rotation of the hydraulic transmission 33 is changed, the ring gear 7 is forward rotated, reverse rotated or stopped interlockingly therewith.

In the seventh embodiment, when an overload acts on the output shaft 8 side, as in the case of the fifth embodiment illustrated in FIG. 7, the overload is undertaken by the worm mechanism 200. As a result of the reverse rotation prevention action of the worm mechanism 200, an excessive torque that results from this overload is prevented from being transmitted to the hydraulic transmission 33.

It is to be noted that although in each of the above-mentioned embodiments the hydraulic motor or hydraulic transmission 33 is connected to the ring gear 7, the present invention is not limited thereto. This system may be of any type if it is a reversible/variable rotation type hydraulic driver system that is driven by the oil pressure.

What is claimed is:

1. A variable speed power transmission apparatus comprising:

a drive source;

an epicycle reduction gear device including a ring gear having internal teeth and external teeth, a sun gear having external teeth, an input shaft connected to said sun gear, a plurality of planetary gears meshed between said internal teeth of said ring gear and said external teeth of said sun gear, an output shaft, a plurality of carriers connected to said output shaft, wherein torque is input to said input shaft from said drive source through a transmission device and to said external teeth of said ring gear, and each of said planetary gears has a shaft connected to one of said carriers such that said planetary gears are supported at equal intervals circumferentially about said sun gear;

a brake, provided on said ring gear, for stopping rotation of said ring gear;

a hydraulic transmission to which the torque is input from an output end of said drive source through a transmission path that branches off from a transmission path leading to said transmission device; and a worm mechanism comprising a worm connected to an output shaft of said hydraulic transmission and a worm wheel meshed with said worm, wherein said worm wheel is interlockingly connected to said ring gear, and said ring gear is forward rotated, reverse rotated or stopped by said hydraulic transmission through said worm mechanism.

* * * * *